(12) United States Patent
Connor

(10) Patent No.: US 7,010,613 B2
(45) Date of Patent: Mar. 7, 2006

(54) METHODS AND APPARATUS FOR REDUCING FRAME OVERHEAD ON LOCAL AREA NETWORKS

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 09/948,186

(22) Filed: Sep. 7, 2001

(65) Prior Publication Data

US 2003/0051045 A1    Mar. 13, 2003

(51) Int. Cl.
*G06F 15/16* (2006.01)
(52) U.S. Cl. .................. 709/236; 709/230; 709/231; 709/237; 709/238; 370/470; 370/475; 370/476
(58) Field of Classification Search ............... 709/236, 709/230–231, 232, 237, 238; 370/470–476
See application file for complete search history.

(56) References Cited

U.S. PATENT DOCUMENTS

| | | | | |
|---|---|---|---|---|
| 6,023,563 A * | 2/2000 | Shani | .................. | 709/249 |
| 6,041,054 A * | 3/2000 | Westberg | .................. | 370/389 |
| 6,408,001 B1 * | 6/2002 | Chuah et al. | .................. | 370/392 |
| 6,430,621 B1 * | 8/2002 | Srikanth et al. | .................. | 709/238 |
| 6,438,137 B1 * | 8/2002 | Turner et al. | .................. | 370/466 |
| 6,452,920 B1 * | 9/2002 | Comstock | .................. | 370/349 |
| 6,522,654 B1 * | 2/2003 | Small | .................. | 370/400 |
| 6,577,627 B1 * | 6/2003 | Driscoll et al. | .................. | 370/389 |
| 6,608,841 B1 * | 8/2003 | Koodli | .................. | 370/474 |
| 6,618,397 B1 * | 9/2003 | Huang | .................. | 370/474 |
| 6,711,164 B1 * | 3/2004 | Le et al. | .................. | 370/392 |
| 6,721,333 B1 * | 4/2004 | Milton et al. | .................. | 370/469 |
| 6,754,231 B1 * | 6/2004 | Jonsson et al. | .................. | 370/474 |
| 6,798,775 B1 * | 9/2004 | Bordonaro et al. | .................. | 370/392 |
| 6,804,238 B1 * | 10/2004 | Euget et al. | .................. | 370/392 |
| 2001/0056490 A1 * | 12/2001 | Nagami et al. | .................. | 709/227 |
| 2002/0027906 A1 * | 3/2002 | Athreya et al. | .................. | 370/386 |
| 2002/0064190 A1 * | 5/2002 | Sikora et al. | .................. | 370/537 |
| 2003/0198226 A1 * | 10/2003 | Westberg | .................. | 370/393 |
| 2003/0206518 A1 * | 11/2003 | Yik et al. | .................. | 370/230 |

OTHER PUBLICATIONS

David C. Plummer, "An Ethernet Address Resolution Protocol," Nov. 1982, http://www.faqs.org/rfcs/rfc826.html, pp. 1-9.*

* cited by examiner

*Primary Examiner*—Saleh Najjar
*Assistant Examiner*—ThuHa Nguyen
(74) *Attorney, Agent, or Firm*—Blakely, Sokoloff, Taylor & Zafman LLP

(57) ABSTRACT

Methods, apparatus, and articles of manufacture for reducing frame overhead in communications on local area networks are disclosed herein. The frame overhead is reduced in communications on local area networks by removing unnecessary addressing information from frames prior to transmission on the network. Logical addressing information, such as an Internet protocol address, is utilized to determine the corresponding physical addressing information, such as an Ethernet media access control address, via an address resolution protocol. The physical addressing information is then incorporated into the frames, and the logical addressing information is removed (or not incorporated into the frame) to provide additional space to carry data, thereby increasing the data throughput of the network connection and potentially reducing the number of frames needed to transmit a given communication from a source to a destination within the network.

11 Claims, 4 Drawing Sheets

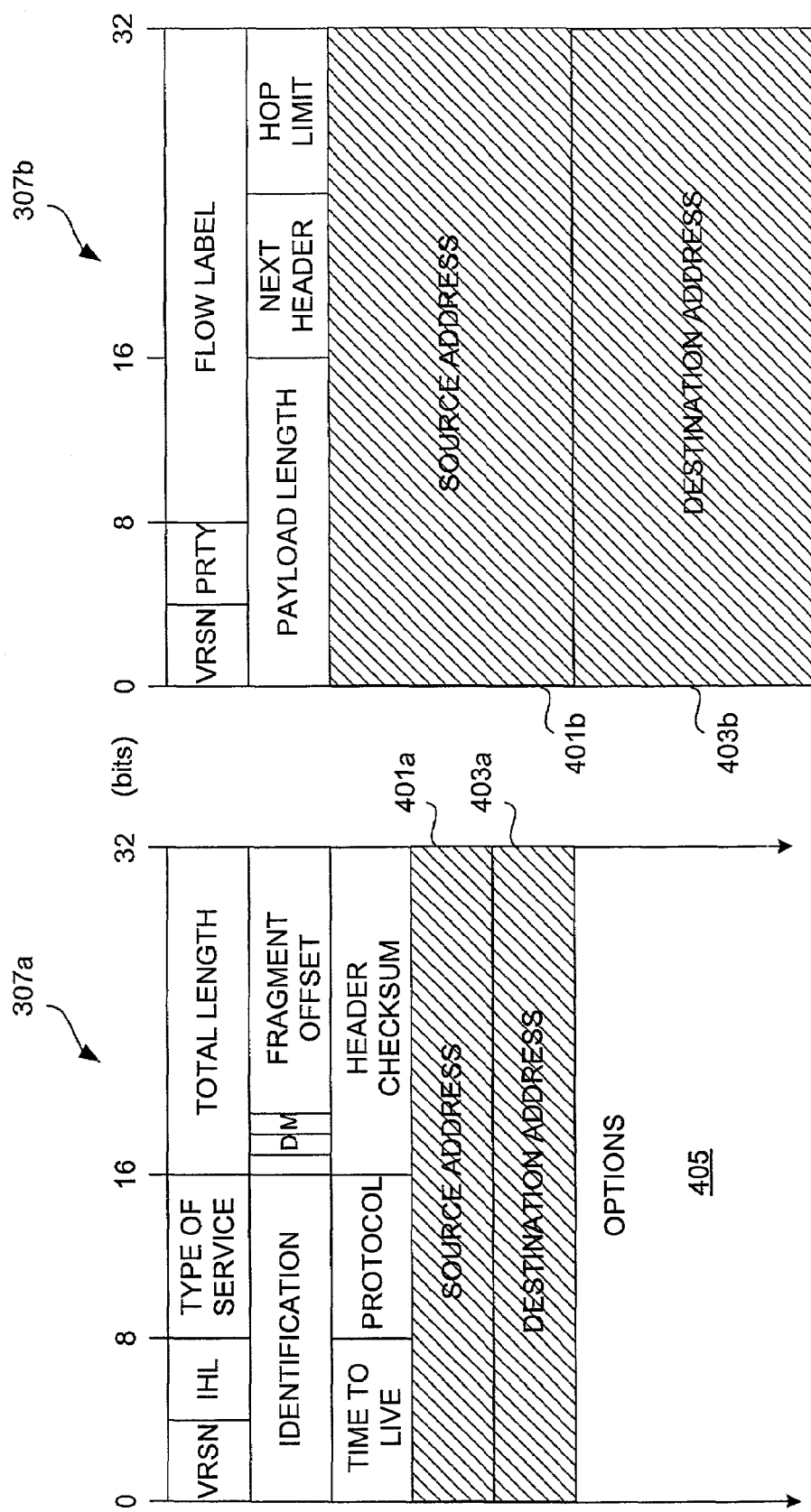

METHODS AND APPARATUS FOR REDUCING FRAME OVERHEAD ON LOCAL AREA NETWORKS

TECHNICAL FIELD OF THE INVENTION

This disclosure relates to the transmission of communications over local area networks, and more particularly, but not exclusively, to methods, apparatus, and articles of manufacture for reducing frame overhead in communications on local area networks by removing unnecessary addressing information from frames prior to transmission on the network.

BACKGROUND INFORMATION

Network communications are generally comprised of one or more frames—packages of information that are transmitted as a single unit from a source to a destination on a network. Because each frame has a finite maximum size defined by the protocols and/or standards used on the network, the number of frames necessary to deliver a communication from a source point on the network to a destination point on the network may vary widely depending on the size of the communication (e.g., the number of bytes of data comprising a message or file to be transmitted over the network). Every frame of the communication, however, follows the same basic organizational pattern, incorporating information into the frame to enable the network's communication protocols to deliver the communication to the intended recipient, and to ensure that the communication arrives intact and without corruption.

Many pieces of information are generally incorporated into each frame to facilitate delivery and error checking of a segment of the communication included in a given frame. These pieces of information are commonly considered frame overhead because they are included in each frame in addition to the data comprising the actual communication. In a standard Transmission Control Protocol/Internet Protocol ("TCP/IP") (TCP refers to the IETF standard RFC 793, Sep. 1, 1981) (IP refers to either the IPv4 (version 4) IETF standard RFC 791, Sep. 1, 1981, or the IPv6 (version 6) IETF draft standard RFC 2460, December 1998) protocol suite, commonly used for data transmission over interconnected networks, such as an Ethernet network (corresponding to the series of IEEE 802.3 networking standards), the frame overhead may include a preamble, an Ethernet header and footer, and IP and TCP headers, as well as other application or layer headers, such as a secure sockets layer, an encapsulating security payload standard, or the like. In addition, an interframe gap ("IFG") separates each frame communicated over the network, and while not technically part of the frame, does consume a portion of available bandwidth on the network and may be considered frame overhead similar to the other elements mentioned above.

Elements of the frame overhead provide several functions, including addressing, routability, reliability, and the like. Each frame also typically includes a payload section, that portion of the frame that contains the data to be communicated over the network, such as a portion of a file or web page, and is the only part of the frame not considered overhead. The number of bytes available in a frame for the payload section is referred to as a maximum segment size ("MSS"), and the ratio of the MSS to the frame overhead determines the maximum efficiency of a network link. For example, if 10% of a frame comprises overhead on a 100 Mbps network connection, the maximum efficiency of the network connection is 90 Mbps of data throughput.

Typically, a full-length TCP/IP Ethernet frame "on the wire" includes an 8 byte preamble, a 14 byte Ethernet header, a 20 byte IP header (IP version 4, with no options), a 20 byte TCP header (with no options), a 1460 byte payload section, and a 4 byte Ethernet footer (also referred to herein as a "frame check sequence" or "FCS"). In addition, the typical IFG consumes an additional 12 bytes per frame. The combination of these elements results in an "on the wire" frame comprising 1538 bytes, of which, only 1460 bytes are usable for the transmission of data. In this example frame, the overhead ratio is 5.1%, resulting in a maximum efficiency of 94.9% or 94.9 Mbps (uni-directionally) on a 100 Mbps Fast Ethernet network connection.

The example TCP/IP Ethernet frame discussed above represents a "best-case" scenario on standard Ethernet networks. Depending on the particular standards and/or protocols adopted for use on a given network, the overhead ratio may be significantly higher, thereby further reducing the data throughout of the network connection, and potentially increasing the number of frames necessary to transmit a complete communication, resulting in prolonged network usage and extended processor utilization.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein:

FIG. 4A is an illustration representing one embodiment of an Internet Protocol header in accordance with the teachings of the present invention; and FIG. 4B is an illustration representing another embodiment of an Internet Protocol header in accordance with the teachings of the present invention.

DETAILED DESCRIPTION OF THE ILLUSTRATED EMBODIMENTS

Embodiments of methods, apparatus, and articles of manufacture for reducing frame overhead on local area networks are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide methods, apparatus, and articles of manufacture for reducing frame overhead in communications on local area networks by removing unnecessary addressing information from frames prior to transmission on the network. Many common network communication protocols include both logical addressing information (e.g., layer 3 addressing) as well as physical addressing information (e.g., layer 2 addressing) as part of the frame overhead. Because methods, such as an address resolution protocol ("ARP") (ARP refers to the IETF standard RFC 826, Nov. 1, 1982), exist for determining physical addresses from corresponding logical addresses, and vice versa (e.g., reverse ARP), the inclusion of both logical and physical address information in the frame overhead is often times redundant and unnecessary within a local area network. As such, the logical address information corresponding to a source and/or a destination on the network may be removed prior to sending the frames on the network without affecting the delivery or integrity of the frames, thereby reducing the frame overhead and correspondingly increasing the percentage of the frame able to carry data. This not only improves the efficiency of the network connection, but may also reduce network usage and minimize processor utilization. Other features of the illustrated embodiments will be apparent to the reader from the foregoing and the appended claims, and as the detailed description and discussion is read in conjunction with the accompanying drawings.

Figure 1:
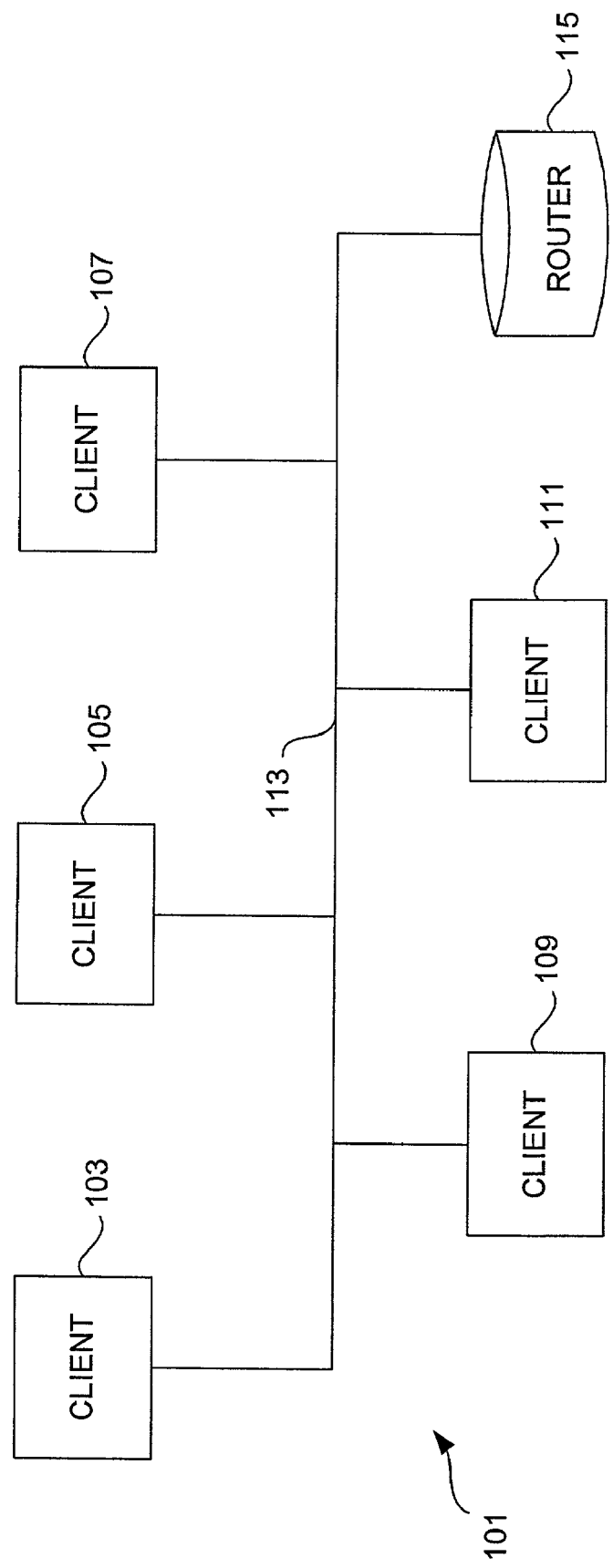
FIG. 1 is a block diagram illustrating one embodiment of a local area network in accordance with the teachings of the present invention.

Referring now to the drawings, and in particular to FIG. 1, there is illustrated a block diagram showing one embodiment of a local area network ("LAN") generally at 101 in accordance with the teachings of the present invention. The LAN 101 includes a plurality of clients 103, 105, 107, 109, and 111 interconnected via a communications link 113 to enable communication between any combination of the clients 103, 105, 107, 109, and 111. In one embodiment, the LAN 101 also includes a router 115 connected to the communications link 113 that may provide a connection to another LAN or other network outside the LAN 101 illustrated in FIG. 1. The clients 103, 105, 107, 109, and 111, and the router 115, represent nodes on the LAN 101. The communications link 113 may comprise wires, cables, optical fibers, or other physical connections in various embodiments of the invention. In other embodiments, the communications link 113 may comprise a plurality of wireless links utilizing some portion of the electromagnetic spectrum, such as for example, but not limited to, radio frequency or infrared signals. In still other embodiments, the communications link 113 may comprise an optical link, or any combination of the foregoing.

Figure 2:
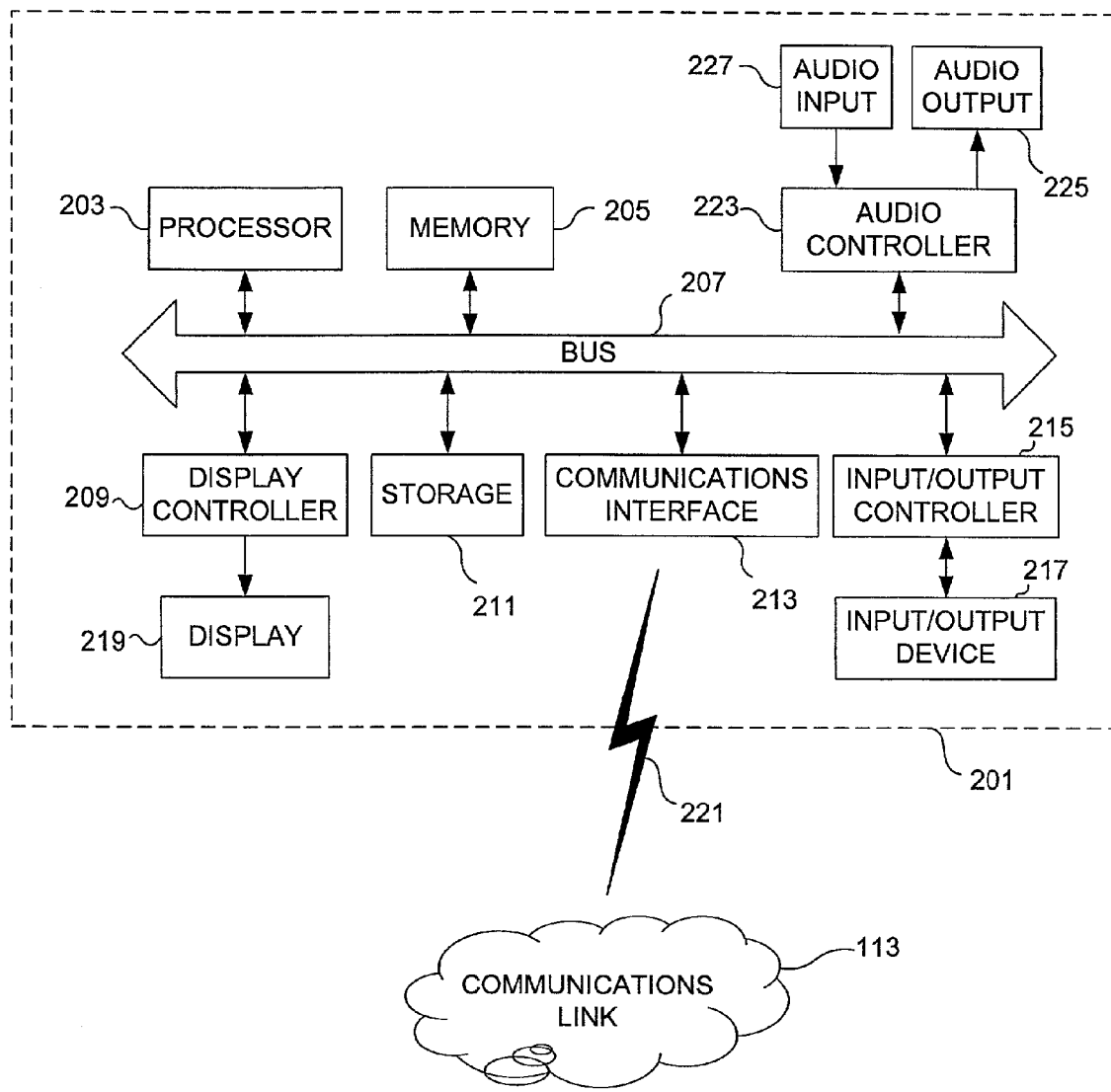
FIG. 2 is a block diagram of one embodiment of a computer system representative of a client on the local area network of FIG. 1 in accordance with the teachings of the present invention.

With reference now primarily to FIG. 2, a block diagram illustrating one embodiment of a machine 201 that may be used for the clients 103, 105, 107, 109, and 111 in accordance with the teachings of the present invention is shown. Typically, the clients 103, 105, 107, 109, and 111 may be various types of machines, including a desktop computer or a workstation, a laptop computer, a PDA, a personal computer, a wireless phone, a server, a router, or other electronic equipment capable of receiving and/or transmitting signals via the communications link 113. In one embodiment, the machine 201 is a computer that includes a processor 203 coupled to a bus 207. In one embodiment, a memory 205, a storage 211, a display controller 209, a communications interface 213, an input/output controller 215, and an audio controller 223 are also coupled to the bus 207.

In one embodiment, the machine 201 interfaces to external systems through the communications interface 213. The communications interface 213 may include a radio transceiver compatible with various modulated signals, wireless telephone signals, or the like. The communications interface 213 may also include an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a communications signal 221 is received/transmitted between the communications interface 213 and the communications link 113. In one embodiment, the communications signal 221 maybe used to interface the machine 201 with another computer system, a network hub, the router 115, or the like. In one embodiment, the communications signal 221 is considered to be machine-readable media, which may be transmitted through wires, cables, optical fibers, or through the atmosphere, or the like.

In one embodiment, the processor 203 may be a conventional processor, such as for example, but not limited to, an Intel x86 processor, or Pentium family microprocessor, a Motorola family microprocessor, or the like. The memory 205 may be a machine-readable medium such as dynamic random access memory ("DRAM"), and may include static random access memory ("SRAM"). The display controller 209 controls, in a conventional manner, a display 219, which in one embodiment may be a cathode ray tube ("CRT"), a liquid crystal display ("LCD"), an active matrix display, a television monitor, or the like. An input/output device 217, coupled to the input/output controller 215 may be a keyboard, a disk drive, a printer, a scanner, or other input/output device, including a television remote, a mouse, a trackball, a trackpad, a joystick, or the like. In one embodiment, the audio controller 223 controls in a conventional manner an audio output 225, which may include for example, audio speakers, headphones, an audio receiver, an amplifier, or the like. In one embodiment, the audio controller 223 also controls, in a conventional manner, an audio input 227, which may include for example, a microphone, or input(s) from an audio or musical device, or the like.

Storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via the communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

Figure 3:
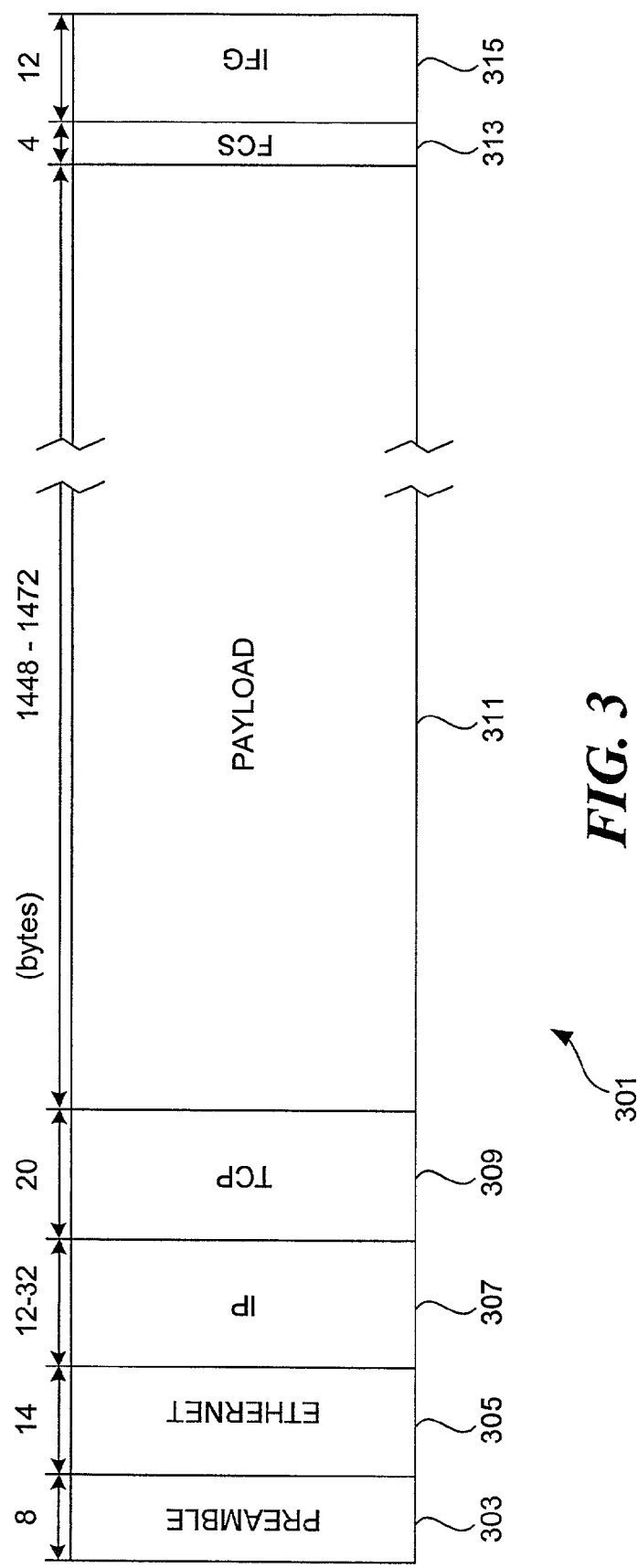
FIG. 3 is an illustration representing one embodiment of a frame in accordance with the teachings of the present invention.

With reference now primarily to FIG. 3, an illustration representing one embodiment of a frame in accordance with the teachings of the present invention is shown generally at 301. The illustrated embodiment represents a format for a standard TCP/IP Ethernet frame that may be communicated on the LAN 101 illustrated in FIG. 1 from a source client (node) on the network (having at least one source node address), such as for example, the client 103, to a destination client (node) on the network (having at least one destination node address), such as for example, the client 111 via the communications link 113. It will be appreciated that other protocols and/or network architectures may be substituted for the protocols and network architectures illustrated and described herein without departing from the spirit or scope of the present invention.

It will be appreciated that other types of addressing information in addition to, or different from, that described herein in conjunction with the illustrated embodiments may also typically appear in frames for communicating information on a network. In accordance with the teachings of the present invention, at least one address corresponding to a client (node) on the network may be identified and correlated to at least one delivery address (that address necessary to the network protocols and/or standards to effectively deliver a frame on a network). In one embodiment, the at least one delivery address may then be incorporated into the frame, and the frame may be transmitted on the network, having the delivery address as its only source of addressing information corresponding to the particular client (node). In one embodiment, the additional addressing information may be deleted from the frame prior to transmission on the network. In another embodiment, the additional addressing information may be maintained in a memory for purposes of correlating it with corresponding delivery address information, and never incorporated into the frame.

In one embodiment, the frame 301 may comprise a preamble 303, an Ethernet header 305, an IP header 307, a TCP header 309, a payload section 311, a frame check sequence or Ethernet footer 313, and an IFG 315 (as mentioned previously, the IFG 315 is not technically a part of the frame 301, but is included in the illustrated embodiment to demonstrate how the frame overhead affects the overall efficiency of a network). In one embodiment, the preamble 303 comprises an 8 byte frame delimiter that begins the frame 301. In practice, the preamble 303 is generally discarded when the frame 301 is processed, but for purposes of describing features of the present invention the preamble 303 should be accounted for in evaluating frame transmission time and the corresponding transmission rate for the network on which the frame is being communicated.

In one embodiment, the Ethernet header 305 comprises a data unit including addressing information that allows the frame to be switched and filtered within the network, such as the LAN 101 (see, e.g., FIG. 1). Various forms of the Ethernet standard exist and are well known to those skilled in the art. For purposes of the present explanation, the Ethernet header comprises three main sections, although in some circumstances, or in various forms of the Ethernet standard, additional sections of information may also be provided in the Ethernet header 305. The three main sections include a 6 byte physical destination address (e.g., a destination media access control ("MAC") address), a 6 byte physical source address (e.g., a source MAC address), and a 2 byte type/length field. The type/length field generally indicates the internetwork protocol (e.g., IP) included in an adjacent layer of a protocol stack into which the various standards and/or protocols are incorporated to facilitate network communication. The particular functions and features of the type/length field are beyond the scope of the present invention and will not be discussed in greater detail herein. As one may recognize from the foregoing, the Ethernet header consumes a total of 14 bytes of the frame 301, but may, in fact, be larger depending on the particular Ethernet standard implemented in a given application.

The IP header 307 comprises a data unit including routing and reassembly information for the frame 301. Generally, two types of IP headers may be utilized in a TCP/IP Ethernet frame such as that represented by the illustration shown in FIG. 3, namely an IPv4 header, or an IPv6 (Internet Protocol, version 6) header, depending on which protocol version is incorporated into the protocol stack. The size (e.g., bytes) of the IP header in the frame 301 depends on the protocol version as well as other factors, such as the inclusion of options within the header. An IPv4 header without options comprises 20 bytes, and with options may be as large as 64 bytes. An IPv6 header comprises 32 bytes and does not support options. Diagrams showing the elements of the IPv4 and IPv6 headers are illustrated in FIGS. 4A and 4B, respectively, and will be discussed in greater detail herein below.

The TCP header 309 comprises a data unit that provides congestion, flow control, and reliability functions. In one embodiment, the TCP header 309, without options, consumes a total of 20 bytes of the frame 301. In another embodiment, the TCP header 309, including options, may be as large as 64 bytes. In one embodiment, the FCS 313 (an Ethernet footer) comprises a data unit that provides error detection. When a frame is transmitted, the sender appends the result of a cyclical redundancy check ("CRC") to the frame in the FCS. The receiver can then verify the CRC to determine if the frame was corrupted in the transmission process. In one embodiment, the IFG comprises a 96 bit-period "space" of inactivity "on the wire" between each transmitted frame 301. To ensure that frames are distinguishable from one another, the Ethernet access format enforces a mandatory "dead time" between each frame, known as the IFG 315. The IFG 315, while not technically part of the frame, must be accounted for in evaluating network efficiency because it represents a finite period of transmission inactivity and detracts from the available bandwidth of the network to transmit frames. As mentioned previously, it should be noted that depending on the particular protocols and/or standards utilized on a given network with which the present invention may be implemented, additional frame overhead elements may also be involved.

With reference now primarily to FIGS. 4A and 4B, two embodiments of the IP header 307 (see, e.g., FIG. 3) are represented as diagrams showing the elements of each header in accordance with the teachings of the present invention. The IPv4 header 307a illustrated in FIG. 4A comprises a variety of individual data units including a 4 byte source address data unit 401a to contain a logical source address such as an IP address, a 4 byte destination address data unit 403a to contain a logical destination address such as an IP address, and an options data unit 405 to contain extensions to the IP headers functionality, which may be utilized to varying degrees in embodiments of the present invention, and may vary in size from 0 bytes to 44 bytes. Similarly, the IPv6 header 307b illustrated in FIG. 4B comprises a variety of individual data units including a 12 byte source address data unit 401b to contain a logical source address such as an IP address, and a 12 byte destination address data unit 403b to contain a logical destination address such as an IP address. Other elements of the IP headers 307a and 307b are well known to those skilled in the art and will not be discussed in any detail herein.

In one embodiment, as part of a process of communicating information and/or data on a network, such as the LAN 101 illustrated in FIG. 1, a client (e.g., clients 103, 105, 107, 109, and 111) generates a plurality of frames (see, e.g., frame 301, FIG. 3) to encapsulate the data and prepare it for transmission on the network via a communications link (e.g., communications link 113). Generating a frame 301 to communicate information on the network includes, in one embodiment, identifying the logical destination address corresponding to a destination client (e.g., clients 103, 105, 107, 109, and 111) on the network. In a standard TCP/IP Ethernet frame, the logical destination address comprises an IP address assigned to a particular client, which may be input via the input/output device 217 (see, e.g., FIG. 2) in an embodiment, and may be contained, in one embodiment, in a data unit (see, e.g., 403a and 403b) within the IP header 307 (see, e.g., FIG. 3) of the frame 301. In one embodiment, generating the frame further includes identifying a logical source address corresponding to a source client (e.g., clients 103, 105, 107, 109, and 111) on the network. As with the logical destination address, the logical source address may comprise an IP address assigned to a particular client in the standard TCP/IP Ethernet frame, and maybe contained in a data unit (see, e.g., 401a and 401b) within the IP header 307. The logical source address may be retrieved from a memory 205 (see, e.g., FIG. 2) within the machine generating the frame in an embodiment.

After identifying the logical address corresponding to the destination client on the network and the logical address corresponding to the source client on the network, generating the frame to communicate information on the network further includes, in one embodiment, correlating the logical addresses to their corresponding physical addresses. In the standard TCP/IP Ethernet frame, the physical addresses correspond to the MAC addresses of the respective communications interfaces (see, e.g., reference numeral 213, FIG. 2) of the destination and source client. In one embodiment, the physical addresses are contained in data units within the Ethernet header 305 (see, e.g., FIG. 3).

Correlating the logical addresses to their corresponding physical addresses may be accomplished, in one embodiment, by utilizing the ARP. The ARP allows a client to resolve a MAC address (physical address) from an IP address (logical address) for each outgoing frame to facilitate delivery of the frame to the intended destination client on the network. The physical source address corresponds to the logical source address, and may be retrieved from a memory 205 (see, e.g., FIG. 2) within the client machine in one embodiment. The physical destination address corresponds to the logical destination address, and may be determined via a comparison of the logical destination address with one or more logical addresses stored in a memory (e.g., memory 205) of the source client. In one embodiment, each of the one or more logical addresses has a corresponding physical address to which it relates. By matching the logical destination address to one of the logical addresses contained in the memory, the corresponding physical destination address may be resolved. In the event that the logical destination address does not match any one of the one or more logical addresses contained in the memory of the source client, the source client, via the ARP, may broadcast an ARP request packet onto the network, requesting that the client having the IP address in question respond with a reply indicating its corresponding MAC address. In one embodiment, the source client may, upon receiving the reply indicating the MAC address of the destination client, add the logical destination address and physical destination address to the memory for reference by the ARP at a future time. If the frame is intended for a client outside the LAN (such as the LAN 101 illustrated in FIG. 1) to which the source client is connected, the router 115 will respond to the ARP request as the physical destination for the frame within the LAN 101.

Within the LAN 101, only the physical address of the destination client on the network is needed to effectively deliver the frame(s). Consequently, for directed (unicast) frames on networks that have layer 2 addressing (e.g., MAC address), the layer 3 addressing (e.g., IP address) may be removed from the frames prior to transmission, and the MSS may be increased accordingly to maximize network data throughput. In one embodiment, the destination client may reconstruct the IP address of the source client, if needed, by utilizing the ARP in a manner as described above, although in reverse wherein the MAC address is known, and the IP address is resolved therefrom. Embodiments of the present invention may be implemented with a network either with IP options (see, e.g., reference numeral 405, FIG. 4A) that communicate the capability during a connection setup that informs clients on the network that IP addresses will be omitted, or by explicit administrator configuration. As mentioned above, in some cases the frame(s) will be directed to a destination client outside the LAN 101 via the router 115. Because the physical address of the router 115 corresponds to a plurality of logical addresses for clients outside the LAN 101, frames directed to the router will, in one embodiment, retain the IP addresses in the IP header to facilitate delivery outside the LAN 101.

As will be appreciated by reference to FIGS. 4A and 4B, removal of the source address (e.g., 401a/401b) and destination address (e.g., 403a/403b) from the IP header 307a or 307b corresponds to an additional 8 bytes (IPv4, FIG. 4A), or 24 bytes (IPv6, FIG. 4B), respectively, of space available to transmit data in each frame. With reference to the example given previously with regard to the standard TCP/IP Ethernet frame utilizing IPv4 (without options) as the internetwork layer, the percentage of frame overhead for a 1538 byte frame will be reduced from 5.1% to 4.6% (the overhead is reduced by 8 bytes from 78 bytes to 70 bytes), increasing the maximum efficiency of a 100 Mbps network connection from 94.9 Mbps to 95.4 Mbps. In a TCP/IP Ethernet frame utilizing IPv6 as the internetwork layer, the frame overhead is reduced from 90 bytes to 66 bytes, a reduction from 5.9% frame overhead to 4.3% frame overhead, improving the data throughput on a 100 Mbps connection from 94.1 Mbps to 95.7 Mbps. In environments in which network performance is near link speed, such as in 10/100 Megabit LANs, the performance gain may be very significant.

Because implementation of embodiments of the present invention allow the MSS of the frame to be increased, not only is the network efficiency increased, but the communication as a whole may take place with fewer frames, thereby reducing network usage and processor utilization. For example, if a 1 Mbyte file (1,048,576 bytes) is being transferred on a network with a MSS of 1448 bytes (corresponding to a frame 301 having an IPv6 header 307b including the source address 401b and the destination address 403*b*), 725 frames would need to be transmitted in order to deliver the communication. However, if the same 1 Mbyte file were being transferred on the network with a MSS of 1472 bytes (corresponding to a frame 301 having an IPv6 header 307*b* without the source address 401*b* and without the destination address 403*b*), only 713 frames would need to be transmitted in order to deliver the communication. With faster link speeds, such as gigabit or 10 gigabit Ethernet networks, where a single client may not be able to saturate a connection because of processor or system bus limitations, the advantages of the present invention can improve overall data throughput by reducing overhead bytes that must be transferred across the system bus, allowing available bus bandwidth to be more efficiently utilized for payload data.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
   generating a frame to communicate information on a local area network, the frame including a first header and a second header, the first header including a logical source address and a logical destination address;
   identifying a physical source address and incorporating the physical source address into the second header;
   correlating the logical destination address with a physical destination address and incorporating the physical destination address into the second header;
   removing the logical source address and the logical destination address from the first header; and
   transmitting the frame on the local area network.

2. The method of claim 1, wherein the first header comprises an Internet protocol header, and the logical source address and the logical destination address comprise Internet protocol addresses.

3. The method of claim 1, wherein the second header comprises an Ethernet header, and the physical source address and the physical destination address comprise Ethernet hardware addresses.

4. The method of claim 1, wherein correlating the logical destination address with the physical destination address comprises executing an address resolution protocol.

5. The method of claim 4, wherein executing the address resolution protocol comprises comparing the logical destination address with one or more logical addresses stored in a memory, each of the one or more logical addresses stored in the memory having a corresponding physical address.

6. An article of manufacture, comprising:
   a machine-readable medium that provides instructions, which, when executed by a machine, cause the machine to:
   generate a frame to communicate information on a local area network, the frame including a first header and a second header, the first header including a logical source address and a logical destination address;
   identify a physical source address;
   incorporate the physical source address into the second header;
   correlate the logical destination address with a physical destination address;
   incorporate the physical destination address into the second header;
   remove the logical source address and the logical destination address from the first header; and
   transmit the frame on the local area network.

7. The article of manufacture of claim 6, wherein the first header comprises an Internet protocol header, and the logical source address and the logical destination address comprise Internet protocol addresses.

8. The article of manufacture of claim 6, wherein the second header comprises an Ethernet header, and the physical source address and the physical destination address comprise Ethernet hardware addresses.

9. An apparatus, comprising:
   a processor;
   a memory, coupled to the processor, to store a plurality of machine instructions; and
   a communications interface, coupled to the processor, to enable the apparatus to connect to a local area network to receive and transmit frames via a communications link;
   wherein execution of the machine instructions by the processor causes the apparatus to generate a frame to communicate information on the local area network, the frame including a first header and a second header, the first header including a logical source address and a logical destination address, to identify a physical source address, to incorporate the physical source address into the second header, to correlate the logical destination address with a physical destination address, to incorporate the physical destination address into the second header, to remove the logical source address and the logical destination address from the first header, and to transmit the frame on the local area network.

10. The apparatus of claim 9, wherein the first header comprises an Internet protocol header, and the logical source address and the logical destination address comprise Internet protocol addresses.

11. The apparatus of claim 9, wherein the second header comprises an Ethernet header, and the physical source address and the physical destination address comprise Ethernet hardware addresses.

* * * * *